No. 618,683. Patented Jan. 31, 1899.
P. B. W. KERSHAW.
TYPE WRITER.
(Application filed June 7, 1898.)

(No Model.) 7 Sheets—Sheet 1.

FIG. 1.

Witnesses: Inventor.
Percy Beresford Wright Kershaw
By Richards
his Attorneys

No. 618,683. Patented Jan. 31, 1899.
P. B. W. KERSHAW.
TYPE WRITER.
(Application filed June 7, 1898.)
(No Model.) 7 Sheets—Sheet 2.

FIG. 2.

No. 618,683. Patented Jan. 31, 1899.
P. B. W. KERSHAW.
TYPE WRITER.
(Application filed June 7, 1898.)

(No Model.) 7 Sheets—Sheet 3.

Witnesses:
E. B. Rotton

Inventor:
Percy Beresford Wright Kershaw
By Richards
his Attorneys.

No. 618,683. Patented Jan. 31, 1899.
P. B. W. KERSHAW.
TYPE WRITER.
(Application filed June 7, 1898.)
(No Model.) 7 Sheets—Sheet 5.

No. 618,683. Patented Jan. 31, 1899.
P. B. W. KERSHAW.
TYPE WRITER.
(Application filed June 7, 1898.)
(No Model.) 7 Sheets—Sheet 6.

Witnesses:
E. B. Bolton

Inventor
Percy Beresford Wright Kershaw
By Richards & Co
his Attorneys.

No. 618,683. Patented Jan. 31, 1899.
P. B. W. KERSHAW.
TYPE WRITER.
(Application filed June 7, 1898.)
(No Model.) 7 Sheets—Sheet 7.

Attest
Walter Donaldson
CS Middleton

Inventor
Percy Beresford Wright Kershaw
by Richards & Co.
Atty

UNITED STATES PATENT OFFICE.

PERCY BERESFORD WRIGHT KERSHAW, OF LONDON, ENGLAND, ASSIGNOR TO HENRY DUNDAS, OF SAME PLACE.

TYPE-WRITER.

SPECIFICATION forming part of Letters Patent No. 618,683, dated January 31, 1899.

Application filed June 7, 1898. Serial No. 682,836. (No model.)

*To all whom it may concern:*

Be it known that I, PERCY BERESFORD WRIGHT KERSHAW, a subject of the Queen of Great Britain and Ireland, residing at London, England, have invented a new and useful Improvement in Type-Writers, (for which I have made application for British Letters Patent under No. 20,130, dated September 1, 1898,) of which the following is a specification.

My invention relates to machines for composing or setting up type or signs of any kind by finger-keys, known as "type-writers," where impressions on paper are taken from such type after being set up, and it includes a magazine of disks or surfaces carrying letters, signs, or numerals, of which there is a complete series of alphabets, numerals, and signs upon a distinct surface or disk for each letter-space in a line, and I set up by selection therefrom a complete line of any desired words, visible to the operator and with opportunity for correction before impression or use, thus reducing the number of printing impressions and inkings. Further, I effect the detachment of the finger-keys from direct operation upon the type-carrying surfaces or disks, each letter being set up and adjusted in a given line by the self-actuated movement of the said surfaces when released by the action of a finger-key, the same key movement effecting a distinctive limitation to the movement of the type-surfaces, thus obviating the necessity for great accuracy in the manufacture and fitting of the finger-keys and their connections where the direct blow of the finger-key produces the printing impression, and as a further consequence I obtain the noiseless action of the keys, which may come home, if desired, on elastic or other pads. Further, there is no spacing of the paper except from line to line or from paragraph to paragraph, each required letter or space in any line being provided from a complete alphabet.

The printing instead of being effected by constant taps from each finger-key is effected only for each line in succession by a steady pressure rather than a blow.

I wish it to be understood that my invention includes any form of mechanism that will practically effect the essential functions and that I describe as one example of how my invention may be carried into effect only one form of mechanism—viz., that in which the complete series of alphabets, signs, or matrices are carried on the surfaces or disks, reference being had to the drawings hereto annexed and to the letters and figures marked thereon.

A is a general casting mounted on a bed-board $a$ and supporting in bearings the type-disk spindle G and the composing-section spindle $c$. To the bed-board $a$ is also fixed an external casing $a'$, inclosing the general mechanism and supporting the keyboard-casting $b^2$.

B is the keyboard, consisting of twenty-seven keys, of which fourteen on the lower tier are white and thirteen on the upper tier are black, similar to pianoforte-keys. The keyboard is also provided with a pawl-key $j^2$ on the extreme left and with two other keys on the extreme right, one above the other, termed "shift-keys" $x'$ $x^2$, all conveniently colored red for distinction, the upper shift-key bringing capital letters into operation and the lower shift-key numerals and punctuations, which will be hereinafter more fully described. Each of the finger-keys has a steel rib $b$, pivoting on the hollow spindle $b'$, with washers $b^7$ between and provided with a nose or feather $b^\times$, engaging in a keyway $b^3$ of the spindle $b'$, of considerably greater width than that of the said feather. The keyway $b^3$ is slotted throughout the length of the spindle $b'$, thus permitting the spindle $b'$ to be turned by the depression of any one key without the said movement depressing the other keys.

The keys are held up in normal horizontal position by springs $b^5$, the key-plates butting at their pivot end upon the under casting $b^2$, and to prevent noise or jar upon the depression of the key the finger end comes upon a buffer $b^6$ of list or similar sound-deadening material. Each internal steel plate $b$ of each finger-key is provided on its under edge with a projection $b^4$, which operates as a control-stop to arrest the movement of the composing-sector C, actuated by a spring $c^3$, when one of the teeth $c^2$ upon the spiral periphery of the sector C opposite to the particular key depressed comes in contact with the said stop $b^4$ on the said key.

The composing-sector C is a spiral skeleton frame keyed to a spindle $c$ and is strained by the spring $c^3$ against a control-bar $d^2$. The said control-bar $d^2$ is operated by the bell-crank arm D, keyed to the finger-key spindle $b'$, and by the links $d'$ and rocking lever $d$ upon the depression of any finger-key, the sector C following the control-bar $d^2$ until it is arrested by one of its teeth $c^2$ coming against the stop $b^4$ of the particular finger-key depressed. It is obvious that the travel of the sector C so obtained will vary according to which finger-key is depressed, and such travel is spring-operated against dead stops quite independent of the actual amount of movement of the finger-keys and unaffected by inaccuracies of the control levers and links actually operated directly by the finger-keys, whose movement is always in excess of that of the composing-sector C. The control-bar $d^2$ is guided to move in a pivoted guide $d^{2\times}$ and the composing device is pressed by a spring $d^{3\times}$ to normal position. Upon the spindle $c$ of the composing-sector is fixed also a cogged sector E, which engages with a rack-bar K and is guided in its sliding travel by a fixed spindle $k$ and an under flanged roller $k'$. The cogged sector E transmits the movement of the composing-sector C by this rack-bar K to the cog-wheel $e$ upon the type-disk shaft G.

Figure 2:
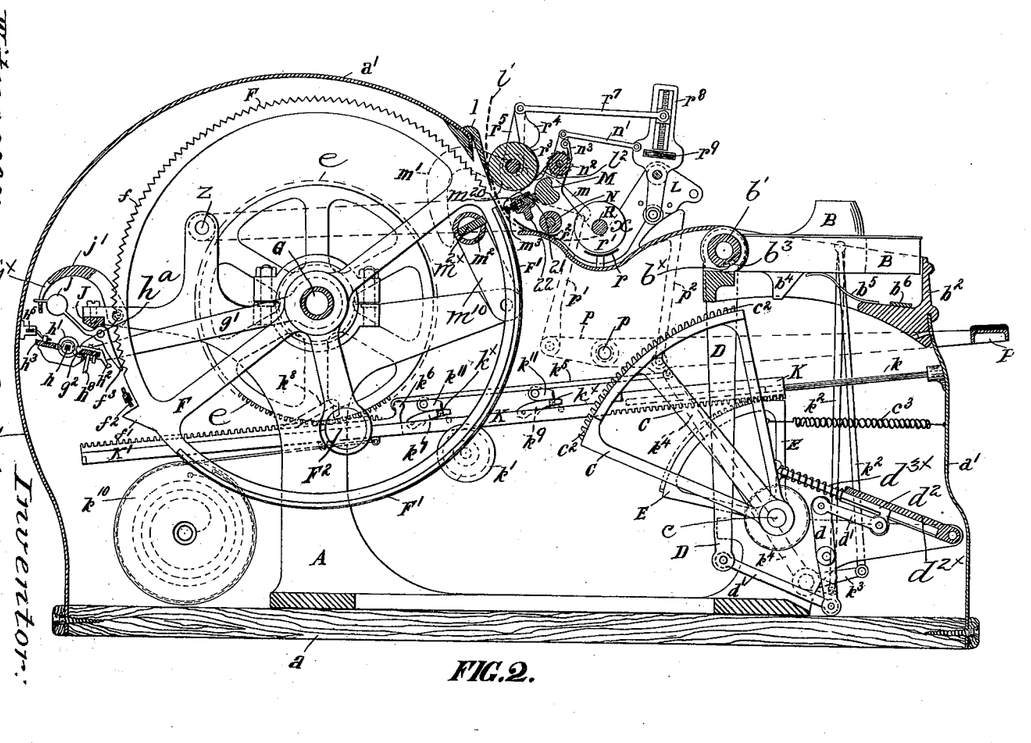
Fig. 2 is a side elevation of the same with side casing removed by section.
Figure 6:
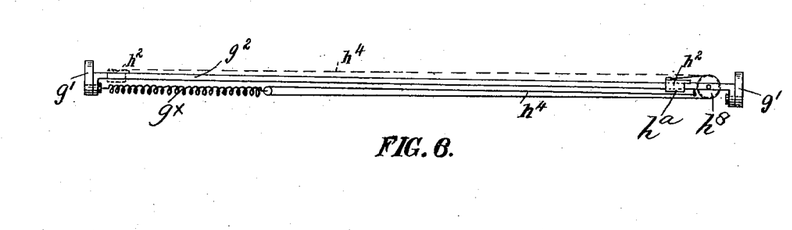
Fig. 6 is a detail view of the disk-setter return-gear. Fig. $6^a$ is a detail view, in side elevation, of the telescoping rack and its operating-levers.
Figures 6A, 7A:
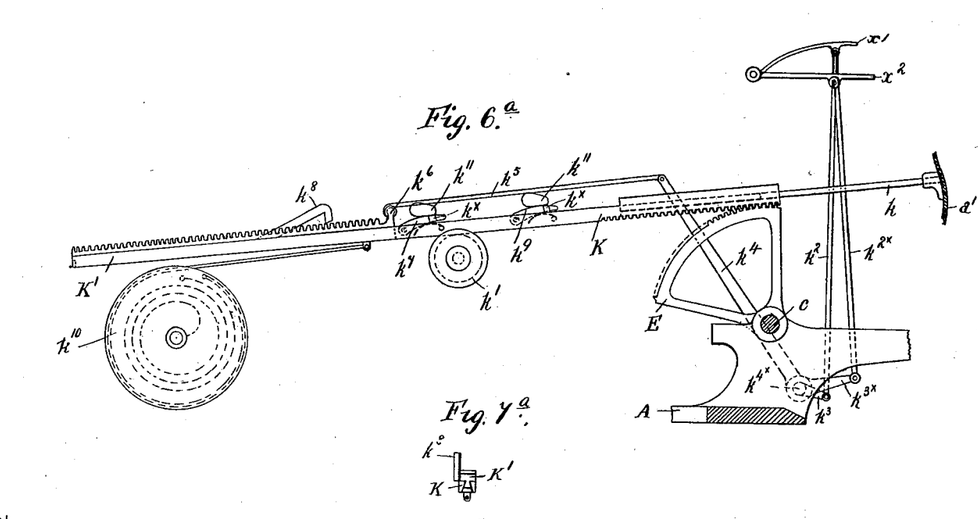
Figure 7:
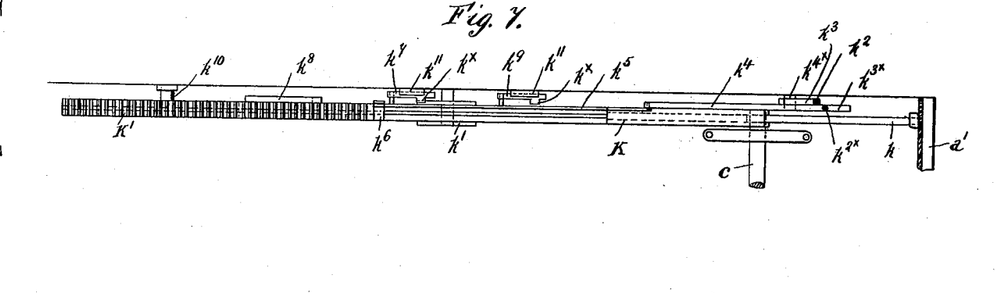
Fig. 7 is a plan of the same with the operating-keys removed for clearness. Fig. $7^a$ is an end view of the bottom of the rack.
Figure 8:
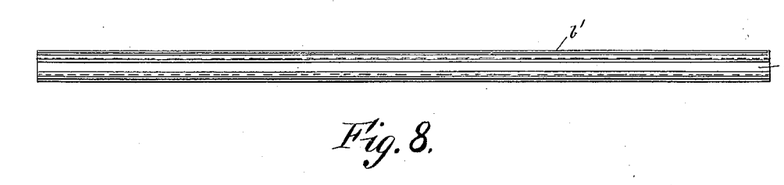
Fig. 8 is a detached view of the finger-key spindle, showing continuous wide keyway therein.
Figure 9:
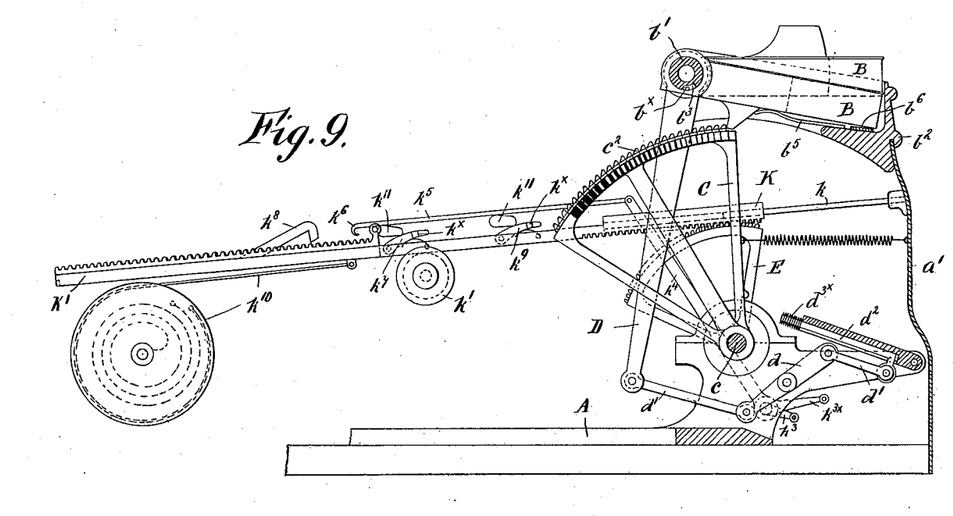
Fig. 9 is a detached view of the resultant movement of composing-sector and telescoping bar after depression of a finger-key.

The lower part K' of this rack-bar K telescopes into the upper portion K, but as shown in Figs. 2, 6, and 7 is out at its extreme length for setting up the small type. Pivotally attached to the upper portion K of the rack-bar are two spring-pressed catches $k^4$ and $k^9$, each provided with a tooth or offset $k^\times$ on their inner faces, adapted to engage a hook $k^8$ on the lower telescoping portion K' when the same is drawn thereover and the said catches are disengaged from their overhead fixed stops $k^{11}$. The fixed stops $k^{11}$ are carried by the casing $a'$ of the machine and normally retain the catches $k^7$ and $k^9$, as shown in Figs. 2 and 6. When capitals are required, the upper shift-key $x'$ is depressed, thrusting down one of the rods $k^2$ and by means of the bell-crank $k^3$ $k^4$ pulling the shift-rod $k^5$, which is hooked over a knob $k^6$ on the lower telescoped part K' of the rack. The rack is held extended, as shown, by a cord and spring-drum $k^{10}$. The depression of this first shift-key $x'$ shortens the rack-bar K to the extent of an alphabet, bringing into operation on the type-disks the next alphabet of capitals for composing. The said bar is held in the said first required shortened position by the hook $k^8$ on telescoping portion K' engaging against the catch $k^7$ after the hook $k^8$ has been drawn over it and the catch $k^7$ has sprung up on leaving the overhead stop $k^{11}$. The function of this engagement of the catch $k^7$ and hook $k^8$ is to retain the racks K K' rigidly attached to one another should it be required to print a succession of capital letters. Otherwise the depression of the first shift-key $x'$ would only shorten the length of an alphabet and leave the upper portion K free to be moved to and fro by the depression of the ordinary keys without setting up any character in line for printing. On release of the shift-key $x'$ the shift-rod $k^5$ falls back to normal length, and the catch $k^7$ is pressed down on the return of the bar K by passing under the stop $k^{11}$, and the lower telescope-section K' of rack K is released and extended again by the spring $k^{10}$. This will be clearly understood on reference to Figs. 2 and 6.

When it is required to set up numerals or punctuations, the lower shift-key $x^2$ is depressed, repeating the operation above described, with the difference that the telescope rack-bar K' is pulled back twice the distance as for capitals, bringing the third series of signs upon the type-disks into operation, and the hook $k^8$ engages the farther catch $k^9$.

Each of the type-disks F is mounted so as to revolve freely on the spindle G, with brass washers G' between the hubs of each disk, and each disk is weighted by an arm and eccentrically-placed balance-weight $F^2$, so that each type-disk presses normally with the projection $f'$ upon a fixed stop-bar $f^2$, so that a blank space is then opposite to the printing-line. The periphery of each disk F is provided with a series of three alphabets or signs—first, small letters; second, capitals, and, third, numerals and punctuations—extending over nearly half its periphery F'. The other half is occupied by setting-teeth $f$, accurately cut and each tooth corresponding to one letter or sign upon the opposite part of the periphery, so that when one of the pawls $f^3$, with pressing-weight $j$, mounted on the bar J, engages into any one of the said setting-teeth $f$ of any disk F a corresponding and desired letter or sign on the said disk is locked on the printing-line.

Figure 5:
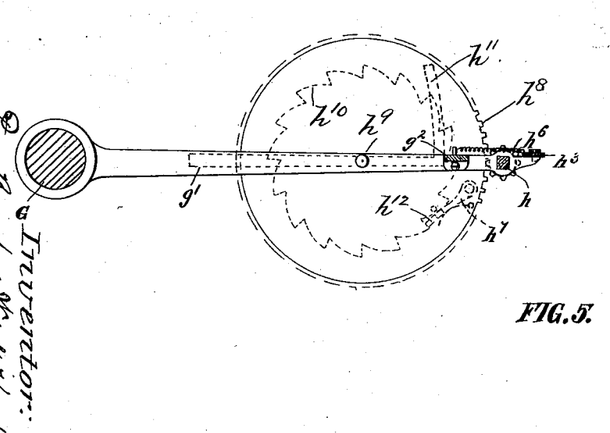
Fig. 5 is a detail view showing side and end elevation of the mechanism for operating the disk-setter spindle. Fig. $5^a$ is an edge view of the ratchet of Fig. 5, with attached mechanism.
Figure 5A:
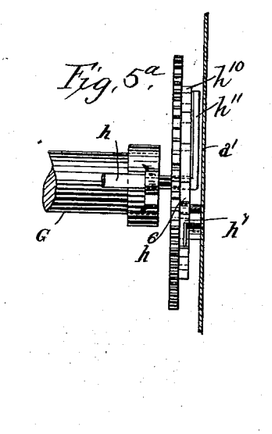

The type-setter is the nose $h^2$, carried by a slide, embracing and traveling upon a bar $g^2$, carried by the arms $g'$, keyed to the spindle G and operated by the wheel $e$ through the rack-bar K and cog-sector E, as hereinabove described. The said arms $g'$ (see Fig. 5) also carry a rack-bar $h^3$, engaging with a worm $h'$, which engages also with the slide of the setter-nose $h^2$ and slides laterally upon a square rod $h$, also carried so as to revolve in the arms $g'$. Attached to the slide of the setter-nose $h^2$ is a cord $h^4$, passing over a pulley $h^8$ at the left-hand side of the supporting-bars $g^2$ and under the influence of a spring (see Fig. 6) $g^\times$, so that when the setter-nose $h^2$ and the worm $h'$ are freed by the disengagement of the rack $h^3$ they return under the said spring pull immediately to the left-hand side of the machine.

The feed of the setter-nose $h^2$ from the left to right of the machine to each type-disk in succession as each type-key is depressed is effected by a complete turn of the worm $h'$, effected on the idle or return travel of the setting mechanism by means of a spur-wheel $h^6$ on the end of the square revolving bar $h$, gearing with a spur-wheel $h^8$, carried on a pin $h^9$, attached to the swinging arm $g'$. On the face of the spur-wheel $h^8$ is a ratchet-wheel $h^{10}$, which as the setting mechanism rises is adapted to engage with a spring-pressed pawl $h^4$, pivoted on the casing $a'$, and be operated thereby. Obviously if the pawl is situated at a point on the casing so that the smallest angular movement of the arm $g'$ for setting up a letter or sign for printing is, through the medium of the gear-wheels $h^8$ and $h^6$, is sufficient on the return stroke to give a complete turn to the square revolving bar $h$. The pawl $h^7$ must not engage the ratchet-wheel $h^{10}$ on the return stroke till this point is reached, and in this case a sector $h^{11}$, attached to the arm $g'$, engages an offset $h^{12}$ on the pawl $h^4$ and retains the same from contact with the ratchet-wheel $h^{10}$ till the aforementioned point is reached. The turn thus given to the bar $h$ and likewise to the sliding worm $h'$ thereon is checked and rendered accurate by the pressure of a spring $n$ upon a flat surface of the revolving bar $h$. It will be understood that the nose $h^2$ engages and operates a disk F when the arms $g'$ move down upon the depression of a key, and upon the upward movement of the said arms the nose is moved one step transversely of the machine by the worm, so as to be ready to move the next disk when next key is operated. When the setter-nose $h^2$ and the worm $h'$ have reached the extreme travel to the right hand of the instrument, the engaging rack-bar $h^3$ is thrown out of engagement with the worm $h'$, and the latter, with its setting-nose $h^2$, being released from engagement with the rack $h^3$ by pulling out the correcting-bar $h^5$ by its knob $h^{5\times}$, is pulled by the tension on the cord $h^4$ to normal position at the extreme left. On releasing the knob $h^{5\times}$ the correcting-bar $h^5$ is returned to normal position by the tension-spring $z$ and the rack $h^3$ by the springs $y$. Said bar slides in bearings $h^a$, and it has fingers $h^{5\times}$, engaging pins $h^b$ on the bar $h^3$.

Figure 1:
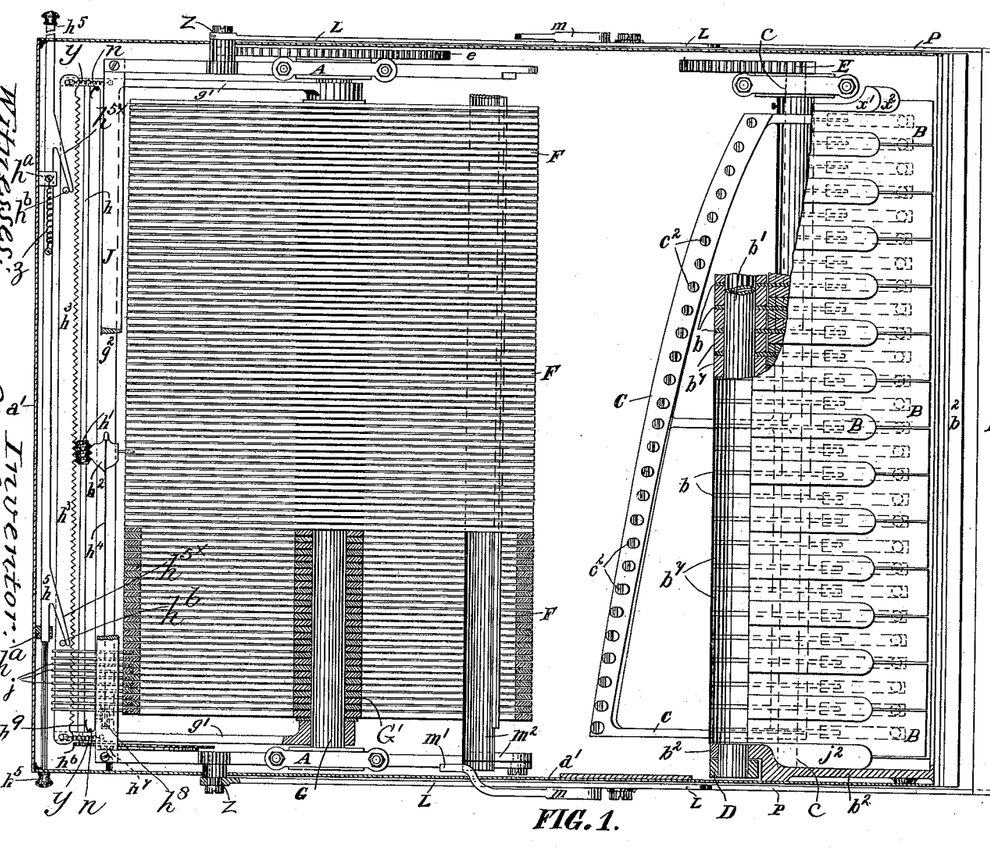
Figure 1 is a plan of a machine according to my invention with the upper casing removed and certain parts in broken section for clearness.
Figure 4:
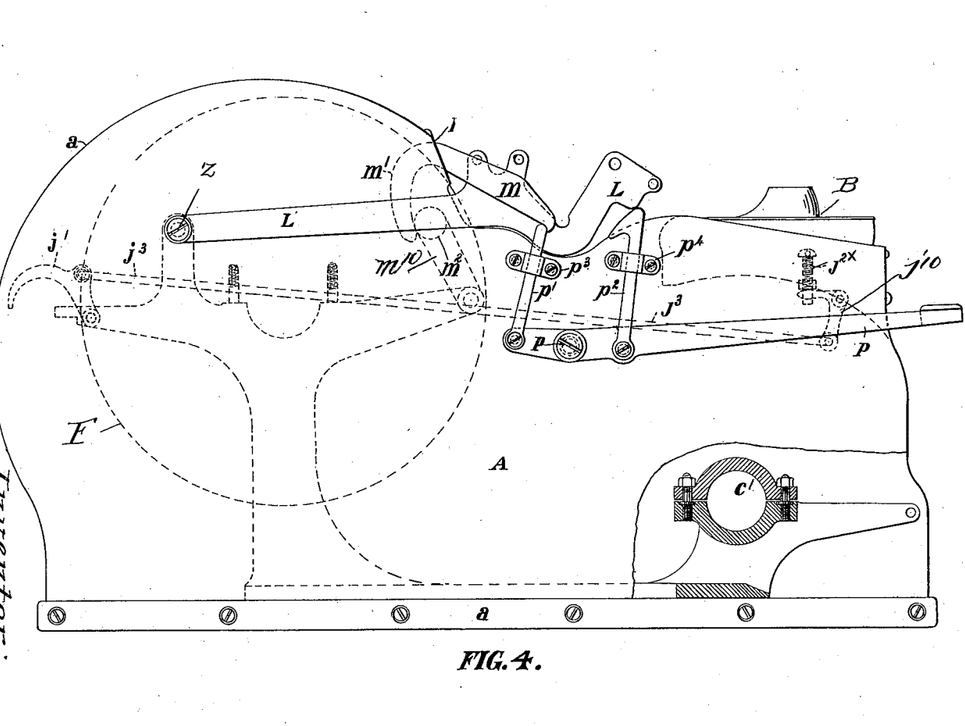
Fig. 4 is an external side elevation of the same, showing printing-levers and links.

When a composed line has been printed, as hereinafter described, and done with, or should the setting up be incorrect, the composed line may be removed and the type-disks returned to their normal position of blank by means of the pawl-release bar $j'$, Figs. 2 and 4, which extends completely across the instrument and permits the tails of the pawls $f^3$ to move in a transverse slot $j^\times$ therein when in normal locking action. This pawl-release bar $j'$ may be lifted by a rod $j^3$ and pawl-key $j^2$ at the extreme left of key-board, Figs. 1 and 4, so as to lift the tails of all the pawls and release all of them, the type-disks by their balance-weights $F^2$ returning to normal position of blank. The said rod $j^3$ is connected with the key $j^2$ by the bell-crank lever $j^{10}$, pivoted to a part of the frame and engaged by a nut on a screw $j^{2\times}$, carried by the key.

The printing mechanism is carried on two side bars L, pivoted upon the general frame at Z on distance-pieces passing through the casing, thus enabling the printing mechanism to be lifted up over the top of the casing and exposing the composed line of type at any time for inspection, and the said side bars L carry the paper-roller R, the pressure-cam M, the platen or printing-bar $m^3$, and the paper-feed roller $r^3$.

The printing when a line is composed and set up is effected by the pressure of the operator by the wrist or hand upon the printing key or bar P in front of the machine. This is pivoted at $p$, and a thrust-rod $p'$ in a fixed guide $p^3$ presses up the lever $m$, fixed to the axis of the pressure-cam M, and at the same time the tail $m'$ of the said lever $m$ presses a gripper-bar $m^2$, provided with a bed-bar $m^{2\times}$ and supported on swinging links from the general casting, so as to press and to grip the under side of the type-disks under the composed line of type in reaction to the face-pressure of the platen-bar $m$, which is backed by india-rubber or other elastic packing 20 in the sliding block 21, operated by the pressure-cam M, the said sliding block passing through a bracket 22.

Figure 3:
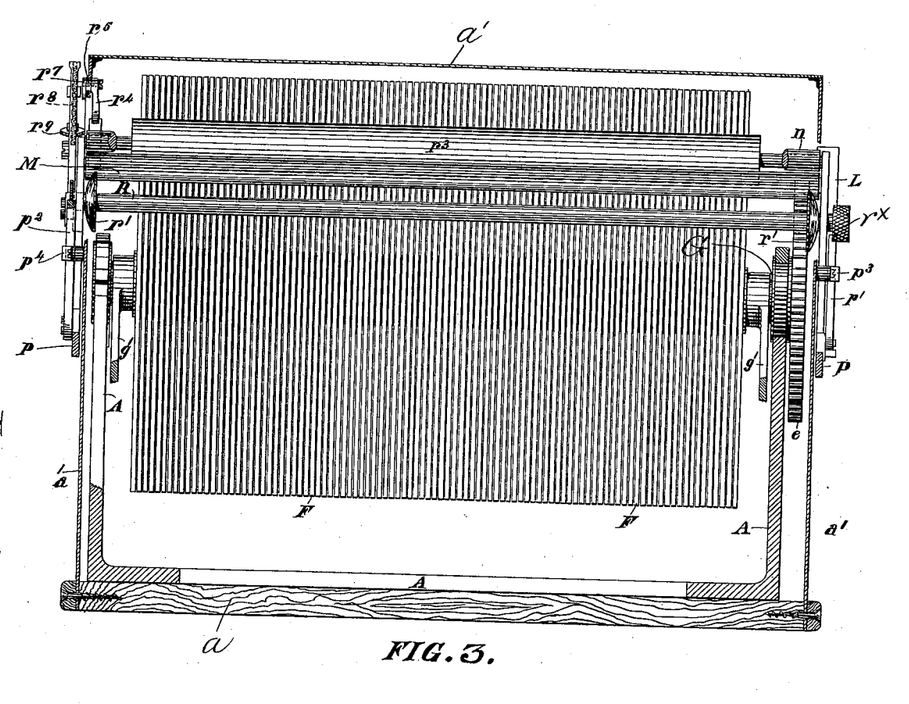
Fig. 3 is a back end elevation of the same with the back casing removed.

The paper is wound around the drum R, the first sheet being clipped by a long flat steel spring $r$, fastened to the spindle. The spindle is covered by a length of india-rubber tubing $x$ to give a grip to the paper. The spindle is fitted with two side disks $r'$ and is provided with a milled head $r^\times$ for revolution by hand. The paper passes from the spindle R under the shield $r^2$, Fig. 3, and under the platen-bar $m^3$ to the india-rubber feed-roller $r^3$, which grips the paper between itself and the feed-slide $l$, as shown by the dotted line $l'$ in Fig. 2.

The feed of the paper is effected by the revolution of the feed-roller $r^3$, operated by a friction feed-pawl $r^4$, hanging from an arm $r^5$, pivoted on the feed-roller spindle and rocked by the link $r^7$ from the slotted rocking bar $r^8$, pivoted on L and worked by a wedge-headed push-rod $p^2$ in a fixed guide $p^4$ from the rocking lever P' and printing-bar P. The pawl $r^4$ slides on the feeding-roller during the travel of printing pressure and feeds the roller and paper on the return travel after printing. The stroke of the link $r^7$ is adjustable by a screw and milled head $r^9$ in the lever $r^8$ for any desired spacing between the printed lines.

The ink for impression is provided by a dry printing-ribbon the full width of the paper or machine. It is wound around the rollers N and $n$ and is passed over the shield $r^2$ and under the platen-bar $m^3$, so as to come between the same and the surface of the paper. The path of the inking-ribbon is shown by the dotted line marked $l^2$, Fig. 2. The roller N is connected by the ink-ribbon so as to revolve with a ratchet-wheel $n^2$, intermittently rotated by a pawl $n^3$, operated by a link $n'$ from the rocking lever $r^3$, so that the printing-ribbon presents continually fresh surfaces for impression.

The operation of my improved type-writer is as follows: A line of type characters, signs, or the like is set up by the depression of any of the finger-keys B required, the depression of any one finger-key turning the spindle $b$ in its bearings through the medium of the feather $b^\times$ and slot $b^3$, and thus giving motion to the links D $d'$ and rocking lever $d$. This latter in turn operates a pivoted stop $d^2$ and draws the same away from engagement with the spring-controlled spiral sector C, which, rocking about its axis $c$, to which axis is also attached a cog-sector E, operates the telescoping rack-bar K. The lower end K' of this telescoping rack-bar K gears with a cog-wheel $e$, which turns the spindle G, to which it is attached and on which are disposed the type-disks F. Secured to the spindle G, one at each end thereof, are two arms $g'$, which carry a bar $g^2$, on which the type-setter $h^2$ is adapted to slide laterally. This setter $h^2$ is adapted to engage a projection $f'$ on each of the type-disks F in succession (when the arms $g'$ are rocked on their axis G) and to push the type-disk around on its pivot, thus bringing a required letter, sign, or punctuation into alinement for printing in front of the printing-bar $m^3$. The amount of angular movement given to the sector C is controlled by a stop $b^4$, depending from the under side of each of the finger-keys, engaging, when a key is depressed, with a tooth $c^2$ on the spiral sector C, and thereby preventing further movement of the said sector. Should a capital letter be required, the first shift-key $x'$ is depressed, which shortens the rack K an alphabet, and thus brings capitals into operation. Likewise, if a punctuation or like sign is required the second shift-key $x^2$ is used, with a further shortening of the rack K. If when a line of type has been set up an error should be noticed, this may be corrected by depressing the pawl-key $j^2$ at the left of the machine, which will return all the type-disks to normal position by releasing their retaining-pawls $f^3$ from engagement therewith. When a line of type has been thus set up for printing, the impression key or bar P in the front of the machine is pressed down, rocking the levers P' about their pivots $p$, thus operating the lever L and bringing into action the platen-bar $m^{2\times}$ and printing-bar $m^3$. When the impression-bar P is released, a swinging lever $V^8$ is operated to feed the paper forward the required space for one line and likewise the inking-ribbon. This is effected by a link $V^4$ and friction-pawl in the former case and link $n'$ and ratchet-pawl $n^3$ in the latter, as hereinbefore fully described.

The composing device C is common to all the type-carrying means, as are also the connections leading from the composing device to the type-carrying means and comprising the sector E, rack-bar K, cog-wheel $e$, arms $g'$, setter-nose, and worm, and these latter parts—setter-nose and worm—constitute an adjustable portion of said connection, which is adjusted step by step across the series of type-carrying means.

Having now described the nature of this invention, I declare that what I claim, and desire to secure by Letters Patent, is—

1. In combination, the series of type-carrying means arranged side by side and each having a complete set of characters, a series of keys corresponding to the series of characters on each type-carrying means, a composing device between the keys and the series of type-carrying means and controlled by the said keys, a setter-nose guided to move transversely across the series of type-carrying means, connections between the composing device and the setter-nose to move the same in one plane to engage and move the type-carrying means and means for giving the setter-nose its movement in the other plane transversely of the type-carrying means, substantially as described.

2. In combination, the series of type-carrying means, a composing device, connections between the same and said carrying means, a spring for operating the composing device, a second spring for normally holding the composing device in inactive position, a series of keys, connections therefrom to the second spring to relieve the composing device of the pressure thereof when a key is depressed, and stops on the keys to limit the movement of the composing device under the action of its operating-spring, substantially as described.

3. In combination, a type-disk spindle, type-disks, freely revolving and eccentrically weighted thereon, provided as to their half-periphery with complete small and capital type alphabets, numerals, and punctuation-signs in relief or intaglio and as to their other half-periphery with setting-cogs, one to each of said letters or signs; a fixed stop-bar reacting by a peripheral step against eccentrically-placed weight of disks; a setting-bar supported by arms keyed to said type-disk spindle; a traversing nose on said composing-bar; means for traversing said nose after each successive movement of the finger-keys, from type-disk to type-disk successively; and means for actuating said setting-bar through a distinctive arc, according to the particular finger-key that may have been depressed.

4. In combination, a series of adjustable type-surfaces each having thereon a plurality of series of alphabets, numerals and signs, a a series of keys for operating the series of surfaces to arrange the desired characters in line, an extensible and collapsible transmitter between the keys and the type-surface and means for changing the position of the type-surfaces to shift from lower to upper case or the like consisting of a shift-key with connections to the extensible transmitter, said key being independent of the character-keys and changing the length of the transmitter between said character-keys and the type-surfaces, substantially as described.

5. In combination finger-keys having feathers in bosses a spindle passing through said bosses, having a longitudinal slot wider than said feathers which enter therein; a revolving spring-actuated composing spiral sector; means attached to said spindle adapted to release the said revolving spring-actuated composing spiral sector and to return the same to normal position upon the rise of any key after depression; and stop projections under said keys determining a distinctive rotation of said composing-sector for each finger-key operated.

6. The combination with a thin type-surface having alphabets or signs thereon, of a platen-bar upon the type side, an eccentric cam producing pressure thereon by actuating mechanism from a manual printing bar or key; an under gripping and supporting surface, coincident with the said platen-bar, and means for simultaneously pressing the gripper-bar to meet the platen-pressure by the same operating-cam of said platen-bar.

7. In a type-writer, the combination with type-disks having complete alphabets numerals and signs arranged upon their peripheries, of mechanism adapted to feed intermittently a paper web, an ink-ribbon and an independent impression-key connected with said mechanism to operate the same upon its return movement.

8. In combination a series of adjacent type-disks F weighted eccentrically and freely revolving so as to come when disengaged to a normal position provided as to half their peripheries with a complete series of alphabets and signs and as to their other half with setting-teeth for each letter or sign; a keyboard B, a release device connected by levers and links to a common spindle $b'$ operated by any of the keys B; a spiral toothed composing-sector C automatically spring-pressed so as to come home when released with a distinctive movement upon a projection $b^4$ of any depressed key; a cogged sector E transmitting the distinctive movement of the composing-sector C, a collapsible rack K transmitting movement of sector E to cog-wheel $e$ on type-disk spindle, a revolving setting-bar $g^2$ an automatically-traversed setting-nose $h^2$ thereon a manually and independently pressed platen type-bar $m^3$; an under gripping bed-bar $m^2$ operated by the said movement as the platen type-bar; paper and ink-ribbon feeds $r^3$ and $n$ with rocking feed-pawls and an impression-key for operating the paper and ribbon feeds, the platen type-bar and gripping bed-bar with connections thereto, substantially as described.

9. In combination, a series of adjacent type-disks F an eccentric weighted arm $F^2$ on each disk a spindle G supporting said disks freely; projections $f'$ on each disk and a fixed stop-bar $f^2$ a setting-bar $g^2$ revolving by arms $g'$ on disk-spindle with a traversing setting-nose $h^2$ thereon; a worm $h'$ engaging with rack $h^3$, a pinion $h^6$ and fixed pawl-rack $h^4$ revolving $h^3$ after each downward stroke of the setting-bar $g^2$ and means for actuating said bar $a$ through a distinctive arc according to such finger-key as may have been depressed substantially as described.

10. The combination with type-disks F, and means for imparting rotary setting motion thereto, a composing-sector C an extendible and collapsible transmitter-bar K between the composing-sector C and setting-bar $g^2$, a tension-spring $k^{10}$; a collapsing rod $k^5$ engaging lower telescopic part of said transmitter-bar K, a detaining-hook $k^8$ and spring-catches $k^7$ and $k^9$ to retain shortened bar K in desired length fixed release-stops $k^{11}$ to disengage catches $k^7$ and $k^9$ and a rocking lever $k^4$ $k^3$ the shift-keys $x$, $x'$ and the connections $k^2$ therefrom to the rocking lever.

11. In combination finger-keys B a feather $b^3$ in the boss of each of said keys, a spindle $b'$ supporting bosses of said keys a longitudinal slot therein wider than said feathers $b^3$ but in which the feathers engage on one side permitting travel of spindle with one depressed key without entraining another the lever-arm D keyed to spindle $b'$ a rocking shaft $d$ and connecting-links $d'$; a release-bar $d^2$ and guide, with reacting spring thereabout and a composing-sector controlled by said bar $d$ and returned to normal position by the reacting spring.

12. The combination with type-disks F having peripheral type alphabets and signs thereon, of an external platen-bar $m^3$, elastically packed in sliding bar a cam M; a cam gab-lever $m$ $m'$ a connecting push-rod $p'$ in guide connected to a printing manual lever P and an internal gripping and supporting bar $m^2$ supported on swinging links from frame, operated by gab-lever $m'$ substantially as described.

13. The combination with type-disks F of a paper-roll R, in pivotable frame L a directing-shield $r^2$ a feed-roller $r^3$ a gripping-pawl $r^4$ on lever $r^5$ a connecting-link $r^7$ and a rocking bar $r^8$ with adjustable screw and milled head $r^9$ therein, a duplicate connecting-link $n'$ ratchet-feed ink-ribbon rolls $n$ and N, and a wedge-headed push-bar $p^2$ in guide pivoted to printing manual bar P to effect simultaneous feed of paper and ink-ribbon on return of bar P after printing, substantially as described.

In witness whereof I have hereunto set my hand in presence of two witnesses.

PERCY BERESFORD WRIGHT KERSHAW.

Witnesses:
REGINALD WILLIAM JAMES,
RICHARD A. HOFFMANN.